(12) United States Patent
Gollnick

(10) Patent No.: US 8,855,920 B2
(45) Date of Patent: Oct. 7, 2014

(54) AUTOMATIC ASSISTANCE FOR ROUTE PLANNING

(75) Inventor: Volker Gollnick, Apensen (DE)

(73) Assignee: Deutsches Zentrum fuer Luft- und Raumfahrt e.V, Cologne (DE)

( * ) Notice: Subject to any disclaimer, the term of this patent is extended or adjusted under 35 U.S.C. 154(b) by 127 days.

(21) Appl. No.: 13/372,616

(22) Filed: Feb. 14, 2012

(65) Prior Publication Data

US 2012/0209522 A1 Aug. 16, 2012

(30) Foreign Application Priority Data

Feb. 14, 2011 (DE) .......................... 10 2011 011 213

(51) Int. Cl.
*G01C 21/34* (2006.01)
(52) U.S. Cl.
CPC ........ *G01C 21/3423* (2013.01); *G01C 21/3469* (2013.01)
USPC ........... 701/410; 701/123; 701/400; 701/409; 701/414; 701/423

(58) Field of Classification Search
None
See application file for complete search history.

(56) References Cited

U.S. PATENT DOCUMENTS

| | | | | | |
|---|---|---|---|---|---|
| 5,875,412 | A | * | 2/1999 | Sulich et al. ................. | 701/428 |
| 8,290,701 | B2 | * | 10/2012 | Mason et al. ................. | 701/422 |
| 2004/0093264 | A1 | * | 5/2004 | Shimizu ........................ | 705/13 |
| 2008/0294339 | A1 | * | 11/2008 | Tauchi et al. ................. | 701/212 |
| 2009/0287408 | A1 | | 11/2009 | Gerdes | |
| 2010/0017110 | A1 | * | 1/2010 | Sengoku et al. .............. | 701/200 |
| 2010/0280748 | A1 | * | 11/2010 | Mundinger et al. .......... | 701/200 |
| 2011/0099100 | A1 | * | 4/2011 | Onishi et al. .................. | 705/37 |
| 2011/0246004 | A1 | * | 10/2011 | Mineta ........................... | 701/22 |
| 2011/0246019 | A1 | * | 10/2011 | Mineta ........................... | 701/33 |
| 2011/0307165 | A1 | * | 12/2011 | Hiestermann et al. ........ | 701/119 |
| 2011/0307166 | A1 | * | 12/2011 | Hiestermann et al. ........ | 701/119 |
| 2012/0022781 | A1 | * | 1/2012 | Wilson ........................... | 701/410 |
| 2012/0158299 | A1 | * | 6/2012 | Cerecke et al. ............... | 701/533 |
| 2012/0179361 | A1 | * | 7/2012 | Mineta et al. ................. | 701/410 |
| 2012/0185169 | A1 | * | 7/2012 | Sengoku et al. .............. | 701/527 |
| 2012/0209522 | A1 | * | 8/2012 | Gollnick ........................ | 701/527 |
| 2013/0173147 | A1 | * | 7/2013 | Takeuchi et al. .............. | 701/123 |
| 2013/0197791 | A1 | * | 8/2013 | Struzik .......................... | 701/123 |
| 2013/0245943 | A1 | * | 9/2013 | Hiestermann et al. ........ | 701/533 |
| 2013/0290056 | A1 | * | 10/2013 | Cooper .......................... | 705/7.18 |

FOREIGN PATENT DOCUMENTS

| | | |
|---|---|---|
| DE | 19636379 C1 | 3/1998 |
| DE | 10212997 A1 | 10/2003 |
| EP | 0978705 A2 | 2/2000 |
| EP | 2378249 A1 | 10/2011 |

* cited by examiner

*Primary Examiner* — Thomas Tarcza
*Assistant Examiner* — Richard Goldman
(74) *Attorney, Agent, or Firm* — Whitham, Curtis, Christofferson & Cook, P.C.

(57) ABSTRACT

A method is provided for automatically assisting the route planning between a starting point and a destination.
At least one respective traffic route is ascertained between the starting point and the destination for different means of transport by a traffic route ascertainment unit. The at least one means of transport is associated with the respective traffic route.
Emission information is ascertained by an emission ascertainment unit for each traffic route on the basis of the means of transport which are associated therewith and on the basis of the traffic route length of the respective traffic route.
The route planning is assisted between starting point and destination on the basis of the emission information.

13 Claims, 2 Drawing Sheets

AUTOMATIC ASSISTANCE FOR ROUTE PLANNING

FIELD OF THE INVENTION

The invention relates to a method for automatically assisting the route planning between a starting point and a destination. The invention also relates to a computer program and to an apparatus in this regard.

BACKGROUND

Navigation systems and telematics applications, as can be found in motor vehicles and even already in mobile terminals, such as smartphones, for example, are capable of ascertaining a traffic route between a starting point and an end point which are chosen by a user. In this case, the user can usually choose whether the traffic route needs to be optimized in terms of time, i.e. the fastest connection, or in terms of route length, i.e. the shortest connection. Depending on the setting, different traffic routes can be obtained for one and the same means of transport.

In the case of route ascertainment services which a user can access online, there is usually also the option of choosing the type of means of transport to a limited extent, i.e. whether the user wishes to cover the distance by car, by bicycle or on foot, for example. However, these services that are provided are limited to purely privately or individually available means of transport.

In the case of public means of transport, which are usually timetable-controlled, services are likewise already provided online which a user can use to select a traffic route from a starting point to a destination. In this case, the starting points and destinations are stipulated, discrete points (for example railroad stations) and are therefore less flexible than private or individually useable means of transport. In this case, too, the user can usually choose the type of public means of transport, or the type of train (regional train, ICE), which is ultimately expressed in the charge structure and pricing.

With the rising environmental consciousness in western industrial countries, the environmental burden of our conduct and actions is moving increasingly to the foreground. Thus, for example, it is general knowledge that some citrus and tropical fruits which can be found in our supermarkets have a very poor $CO_2$ balance, since transporting them requires considerable quantities of fossil fuel. The better the $CO_2$ balance in this case, the more ecological and sustainable are these goods, which the consumer appears to hold in higher and higher regard.

SUMMARY

It is therefore an object of the present invention to specify an improved method which also involves the ecological side of route planning being taken into consideration.

The object is achieved with the method of the type cited at the outset by virtue of:
- ascertainment of at least one respective traffic route between the starting point and the destination for different means of transport by a traffic route ascertainment unit, and association of the at least one means of transport with the respective traffic route,
- ascertainment of emission information by an emission ascertainment unit for each traffic route on the basis of the means of transport which are associated therewith and on the basis of the traffic route length of the respective traffic route, and
- assistance of the route planning between starting point and destination on the basis of the emission information.

Accordingly it is proposed that the route planning between a starting point and a destination involves at least one respective traffic route being ascertained for different means of transport. Each traffic route is then allocated this means of transport for which the traffic route has been ascertained. On account of the use of various means of transport for calculating the traffic route, the widest variety of traffic routes are thus also obtained, which becomes quickly evident from the means of transport, motor vehicle and train, for example.

Next, a piece of emission information is thus obtained for each traffic route and means of transport associated with this traffic route. By way of example, such emission information may be the emission of $CO_2$, which a means of transport emits when covering a distance, or has been emitted on the basis of the provision of energy in advance (headword "$CO_2$ balance"). In terms of the route length, it is thus possible to ascertain for each traffic route how much emissions the respective means of transport associated with the traffic route emits or has emitted. Next, the actual route planning between the starting point and the destination is assisted on the basis of this emission information. Thus, by way of example, it is possible to indicate to a user what means of transport produce what emission burden on what traffic route. In this regard, the user can choose a traffic route which is appropriate to him, for example the one which has the best $CO_2$ balance. For logistics companies, too, which hold in high regard an ecological and sustainable transport system for goods transport, however, it makes sense to establish which means of transport for goods ultimately makes most ecological sense for a route from a starting point to a destination. Therefore a system for the emission- and route-oriented choice of means of transport is proposed.

Within the context of this invention, means of transport are understood to mean any types of means of transport. In principle, it is particularly advantageous in this case if a comparison is made precisely between private or individual means of transport and public and timetable-controlled means of transport for the emissions they give off. Thus, for a passenger on a relatively long route, for example, it is possible to display the emission information for a car, for the train and the aircraft. In this case, a means of transport is also understood to mean a bicycle and ultimately also travel on foot.

Furthermore, it is quite particularly advantageous if the route planning is assisted on the basis of a comparison between the individual pieces of emission information from the traffic routes, for example by a route planning unit. From this comparison, the traffic route which is most efficient in terms of emissions can also be displayed to a user automatically, for example. Therefore, the route planning can be optimized not only in terms of the criteria time and distance but also in terms of emissions to be expected.

Advantageously, the emission information from a traffic route for a means of transport can be ascertained by taking account of statistical average values for the energy consumption. Thus, by way of example, it is known how much energy an ICE requires for a distance of 100 km, for example. From this, it is then possible to infer the emission produced in order to provide the energy required for the ICE train. In this case, it is naturally also possible to take account of different methods of energy provision, for example whether the energy comes from regenerative energy sources or from nuclear energy.

Advantageously, the traffic routes are furthermore ascertained by taking account of a departure and/or arrival time which the user desires.

Furthermore, it is quite particularly advantageous if a piece of time information is ascertained for each traffic route and for the means of transport which are associated therewith. By way of example, such a piece of time information may be the statistical time period which the means of transport requires for covering the distance. Thus, the user can choose whether his traffic route is to be optimized in terms of time or emission.

Advantageously, ascertaining the time information involves taking account of current traffic information from the respective traffic route and from the respective means of transport. Furthermore, the traffic information from the traffic route can also influence ascertainment of the emission information. Thus, by way of example, the emissions from a motor vehicle increase when said vehicle is queuing or in slow-moving traffic for a relatively long period of time. This information can be included in the emission information and then corrects the result usually adversely upward.

It is quite particularly advantageous if for timetable-controlled means of transport, for example, local public means of transport, trains, aircraft and ships, the traffic routes are ascertained on the basis of a timetable which can be accessed online. The method according to the invention can therefore also be used on mobile online equipment.

It is not a rare occurrence for a traffic route to be an intermodal traffic route. Intermodal traffic routes are traffic routes on which the distance needs to be covered using different means of transport. An example of this is a relatively long distance which needs to be covered on an aircraft, with the actual traffic route also including the journey to the airport and the journey from the airport to the actual destination. In the case of such an intermodal traffic route, the traffic route therefore comprises a plurality of sub-routes for which different means of transport need to be used.

In the case of such intermodal traffic routes, it is quite particularly advantageous in this context if means of transport are allocated for the different sub-routes and the emission information is then ascertained on the basis of this. The emission information is then obtained from the emission information from the individual sub-routes. Thus, by way of example, various means of transport can be chosen for the journey to an airport which ultimately influence the emission burden that is to be expected.

The object is otherwise also achieved by means of a computer program having program code means, set up to carry out the above method when the computer program is executed on a data processing installation.

The object is also achieved by means of an apparatus for automatically assisting the route planning between a starting point and a destination, wherein the apparatus has a traffic route ascertainment unit which is set up to ascertain at least one respective traffic route between the starting point and the destination for different means of transport and to associate the at least one means of transport with the respective traffic route, the apparatus has an emission ascertainment unit which is set up to ascertain emission information for its traffic route dependency on the means of transport which are associated therewith having the traffic length of the respective traffic route, and wherein the apparatus is set up to assist the route planning between starting point and destination on the basis of the emission information.

Advantageous refinements of the apparatus can be found in the relevant subclaims.

BRIEF DESCRIPTION OF THE DRAWINGS

The invention is explained in more detail by way of example with reference to the appended drawings, in which.

DETAILED DESCRIPTION

Figure 1:
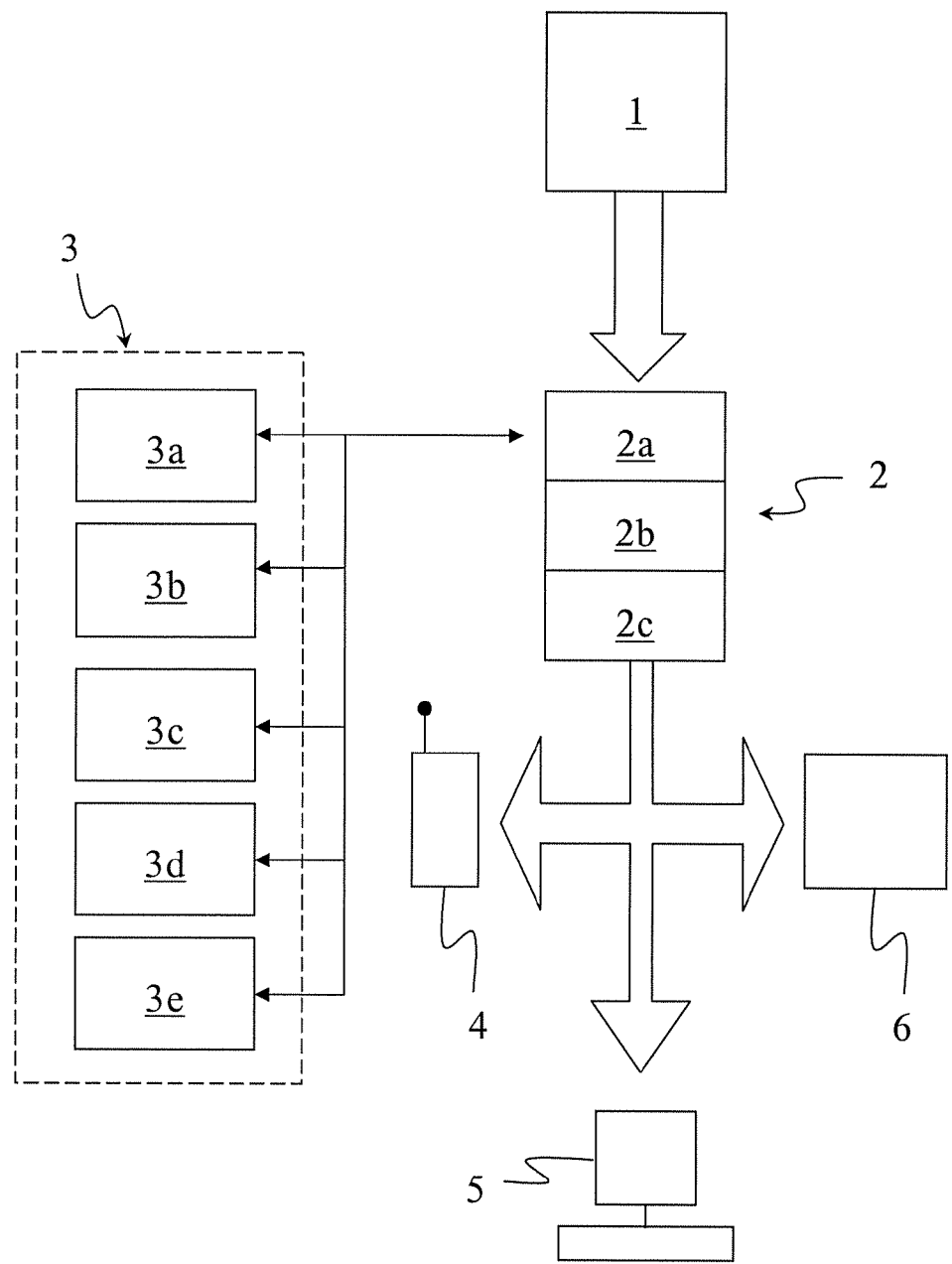
FIG. 1 shows a schematic illustration of the sequence of the present invention.

FIG. 1 schematically shows the sequence of the method. First of all, the route planning is started by the input of the desired route parameters in block 1. At least the starting point and the destination are required for this. By way of example, further parameters may be the arrival or departure time and also further, optional criteria, such as shortest distance or fastest connection and most efficient route in terms of emissions.

Next, the actual route planning takes place in block 2, which is divided into three sub-ranges 2a, 2b and 2c. In sub-range 2a, a traffic route from the starting point to the destination is now first of all ascertained for each means of transport which is available at the starting point, for example. For this, sub-range 2a is in contact with a multiplicity of databases or online service providers in order to ascertain the routes. Thus, it is firstly possible to use air route planning 3a to request or ascertain appropriate timetable-controlled air routes between the starting point and the destination. Furthermore, local transport routes using local public means of transport can be ascertained in 3b. Trunk connections by train can also be ascertained by block 3c. Furthermore, current traffic routes for motor vehicles or road vehicles can be retrieved in 3d, and traffic information in this regard in 3e.

From this information, which can be ascertained from the modules 3a to 3e, shown by way of example, appropriate traffic routes from the starting point to the destination are now ascertained for the widest variety of means of transport. In this case, it is naturally possible to take account of a desired arrival or departure time as well. Depending on the traffic information, for example hindrances or delays in the operating sequence, it is also possible to ascertain alternative routes in order to by-pass the traffic hindrances. Ultimately, it is therefore possible to ascertain entirely different traffic routes for a means of transport.

In step 2b, the relevant emission information is now ascertained for all the traffic routes ascertained in 2a. This information can be ascertained by virtue of statistical average consumptions for the individual means of transport which have been used to ascertain the traffic route. Thus, by way of example, the required energy which a train consumes for covering the distance can be used to derive how much emissions have been produced in order to provide this energy. In this case, it is naturally possible to take account of the widest variety of types of energy sources as well, so that the local transport consumer can choose a route which is operated by a transport provider which holds clean energy in high regard.

In the case of road vehicles, it is furthermore also possible to take account of different types of road vehicles. Thus, by way of example, a small car consumes considerably less energy than SUVs, which means that different emission information (for example $CO_2$ emissions) can also be ascertained therefrom.

When an appropriate piece of traffic information has now been ascertained for each traffic route and the means of transport which is associated therewith, an appropriate comparison can now take place in the last step 2c. If the preference of the user was for a traffic route which is as ecological as possible, the traffic route using the means of transport which has the lowest emissions is chosen. If the preference was for time optimization, for example, then it is possible to choose that traffic route which is the fastest, in which case, the relevant emissions can also be presented for each traffic route as well, however.

Furthermore, it is possible to derive a statistical comparison, for example such that it is possible to establish how much emissions are emitted per time. It is also possible to scale the emission information for the type of transport such that in the case of means of transport which are by nature designed to convey a large number of passengers, the emission information is broken down over the individual passengers.

Next, the comparison performed in 2c can be displayed to the user as appropriate. Thus, the presented method can take place in a mobile terminal 4 (smartphone), for example, so that the user has mobile access thereto. The relevant timetables and route services can then be accessed by the mobile terminal 4 via the Internet. However, it is also conceivable for the mobile terminal to automatically connect to an appropriate service when entering a railroad station or an airport, said service then providing the desired information.

However, it is also conceivable for the method to be used at home by a fixed PC 5, in which case the method can take place on a remote server or directly on the PC 5 using a piece of installed software.

It is particularly advantageous if, in large railroad stations or airports, the continuations of journeys are presented on a display panel or a terminal 6 provided for this purpose as appropriate. Access to such a system can be provided by travel product providers as a charged or free service for customers using customer cards such as Miles and More or a railcard. A traveler at a railroad station is therefore able to obtain information about his further routes and to decide whether to cover the next part by car or by train.

Figure 2:
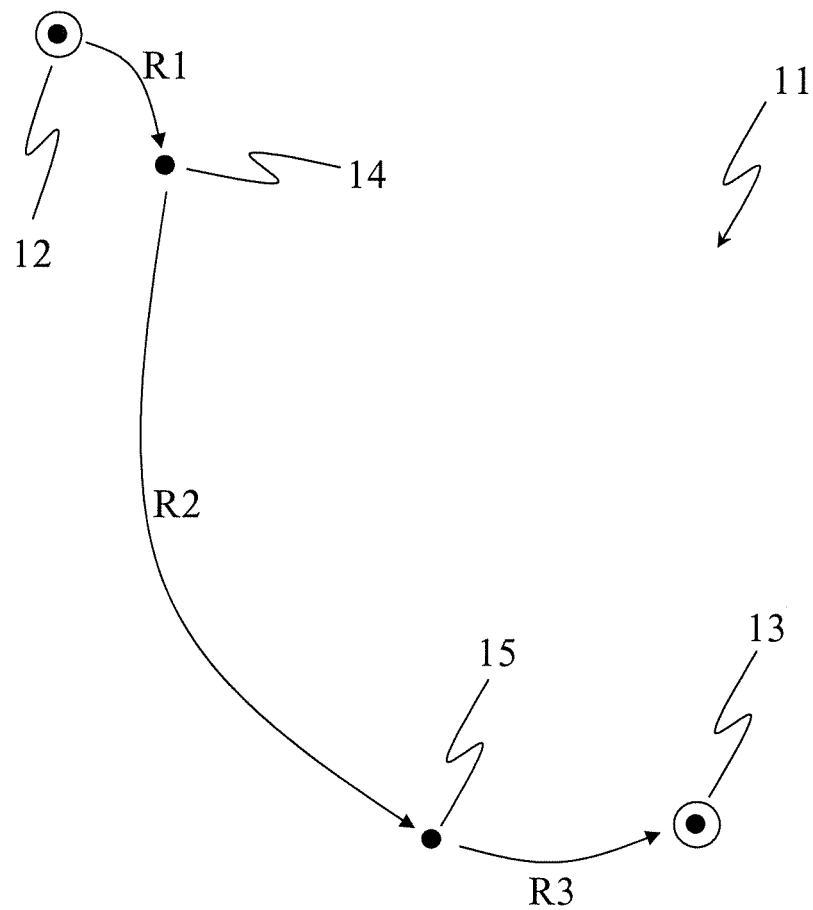
FIG. 2 shows exemplary route planning between a starting point and a destination.

FIG. 2 shows an example of an intermodal traffic route 11 between a starting point 12 and a destination 13. By way of example, the starting point 12 is the place of residence of the traveler in the inner city, for example, Munich. The end point 13 is the travel destination, for example a suburb of Hamburg.

The route of travel can now be covered at one time completely by car, which on its own is not an intermodal traffic route. However, it is also conceivable to cover a large part of the distance to be covered by train or aircraft. For this, the traveler must first of all get to a relevant railroad station or airport. These discrete change points are denoted by 14 and 15.

From the starting point 12 to the first change point 14, a first route $R_1$ is obtained which can be covered by car, on foot or using public means of transport, for example. The second sub-route between the two change points 14 and 15 is denoted by $R_2$ and can be completed by aircraft or train (for example in Munich, Hamburg), depending on the means of transport. Finally, the traveler needs to get from the change point 15 to his destination 13, which he again can accomplish using a car, the train or public means of transport. The last sub-route is denoted by $R_3$. For this distance between the starting point 12 and the destination 13, the widest variety of traffic routes are therefore obtained, depending on which means of transport are chosen for the individual traffic routes $R_1$ to $R_3$. For each sub-route, it is then possible to ascertain particular emission information for the means of transport. All of the emission information from the total distance 11 is then obtained from the sum of the individual pieces of emission information from the sub-routes $R_1$ to $R_3$.

The user therefore has the opportunity to check whether it makes ecological sense to use public means of transport to get to the change locations 14 and 15 or whether it makes more sense to drive or the like.

The invention claimed is:

1. A method for automatically assisting route planning between a starting point and a destination, comprising steps of:
    ascertaining one or more traffic routes between the starting point and the destination with a traffic route ascertainment unit, wherein at least one means of transport from a plurality of different means of transport is associated with each respective traffic route of the one or more traffic routes:
    ascertaining emission information with an emission ascertainment unit for each respective traffic route of the one or more traffic routes on the basis of
        the at least one means of transport associated with the respective traffic route,
        a traffic route length of the respective traffic route, and
        statistical average values for energy consumptions of individual means of transport from the plurality of different means of transport, wherein the emission information is further based on emission increases resulting from current traffic information including hindrances or delays; and
    assisting the route planning between the starting point and the destination on the basis of the emission information.

2. The method according to claim 1, wherein the one or more traffic routes of the first ascertaining step are ascertained taking into account at least one of a departure time and an arrival time.

3. The method according to claim 1, further comprising a step of
    ascertaining time information with a time period ascertainment unit for each traffic route of the one or more traffic routes on the basis of the at least one means of transport associated with each respective traffic route and on the basis of the traffic route length of the respective traffic route,
    wherein assistance of the route planning in the assisting step is furthermore based on the time information.

4. The method according to claim 3, wherein the ascertaining of the time information is further based on current traffic information from the respective traffic route.

5. The method according to claim 1, wherein current timetable information for timetable-controlled means of transport is ascertained from a timetable database communicatively connected to the traffic route ascertainment unit, and wherein the ascertaining of the one or more traffic routes is based on the current timetable information.

6. The method according to claim 1, wherein at least one of the one or more traffic routes is an intermodal transport route comprising a plurality of sub-routes associated with at least two different means of transport, emission information being ascertained for each sub-route of the plurality of sub-routes and the emission information for an entire traffic route being ascertained on the basis of the emission information from the plurality of sub-routes.

7. The method according to claim 1, wherein the emission information is further based on different energy sources.

8. The method according to claim 7, wherein the different energy sources include at least one of regenerative energy sources and nuclear energy sources.

9. The method according claim 1, wherein the current traffic information includes slow moving traffic or vehicle queuing.

10. A non-transitory computer readable medium for assisting route planning between a starting point and a destination, the non-transitory computer readable medium having instructions which, when executed by a data processing installation, cause said data processing installation to perform steps of:

ascertaining one or more traffic routes between the starting point and the destination with a traffic route ascertainment unit, wherein at least one means of transport from a plurality of different means of transport is associated with each respective traffic route of the one or more traffic routes;

ascertaining emission information with an emission ascertainment unit for each respective traffic route of the one or more traffic routes on the basis of
- the at least one means of transport associated with the respective traffic route,
- a traffic route length of the respective traffic route, and
- statistical average values for energy consumptions of individual means of transport from the plurality of different means of transport, wherein the emission information is further based on emission increases resulting from current traffic information including hindrances or delays; and assisting the route planning between the starting point and the destination on the basis of the emission information.

11. An apparatus for automatically assisting route planning between a starting point and a destination, comprising:
- a traffic route ascertainment unit configured to ascertain one or more traffic routes between the starting point and the destination and to associate at least one means of transport from a plurality of different means of transport with each respective traffic route of the one or more traffic routes; and
- an emission ascertainment unit configured to ascertain emission information for each respective traffic route of the one or more traffic routes on the basis of
  - the at least one means of transport associated with the respective traffic route,
  - the traffic route length of the respective traffic route, and
  - statistical average values for energy consumptions of individual means of transport from the plurality of different means of transport, wherein the emission information is further based on emission increases resulting from current traffic information including hindrances or delays,
- wherein the apparatus is configured to assist the route planning between the starting point and the destination on the basis of the emission information.

12. The apparatus according to claim 11, wherein the apparatus is communicatively connected to a timetable database for ascertaining current timetables for timetable-controlled means of transport.

13. The apparatus according to claim 11, wherein the apparatus is configured to ascertain current traffic information for the one or more traffic routes.

* * * * *